United States Patent

[11] 3,617,021

| [72] | Inventor | Joseph C. Littmann<br>Temperance, Mich. |
|---|---|---|
| [21] | Appl. No. | 849,024 |
| [22] | Filed | Aug. 11, 1969 |
| [45] | Patented | Nov. 2, 1971 |
| [73] | Assignee | Dura Corporation<br>Toledo, Ohio |

[54] VEHICLE SEAT SUPPORTING AND ADJUSTING MECHANISM
1 Claim, 6 Drawing Figs.

[52] U.S. Cl.................................................. 248/393,
64/4, 74/424.8, 85/32
[51] Int. Cl.................................................. B60n 1/02
[50] Field of Search.......................................... 248/393,
394, 395; 74/424.8; 64/3, 4; 254/103, 99, 98

[56] References Cited
UNITED STATES PATENTS

| 467,515 | 1/1892 | McArthur et al. | 154/99 |
|---|---|---|---|
| 3,229,545 | 1/1966 | Hautau | 74/424.8 |
| 2,817,979 | 12/1957 | Dean | 254/98 |
| 2,929,439 | 3/1960 | Tanaka et al. | 248/393 |
| 2,931,424 | 4/1960 | Pickles | 248/394 |
| 3,037,735 | 6/1962 | Matthews | 248/394 |
| 3,069,924 | 12/1962 | Watanabe et al. | 74/424.8 |
| 3,123,333 | 3/1964 | De Rose | 248/394 |
| 3,344,618 | 10/1967 | Young | 64/3 |
| 3,437,303 | 4/1969 | Pickles | 248/394 |
| 3,513,719 | 5/1970 | Tschanz | 64/4 |
| 3,380,318 | 4/1968 | Henning | 64/3 |

*Primary Examiner*—Edward C. Allen
*Attorney*—Malcolm W. Fraser

ABSTRACT: Vehicle seat supporting and adjusting mechanism in which three reversible electric motors are employed for effecting horizontal to-and-fro movements, and tilting movements respectively, the motors being arranged with two in axial alignment and the third between the other two and at right angles thereto. The drive from each motor to a helical screw shaft is through a worm which meshes with a spiral gear carried by a tiltable annulus. The annulus has internal threads coaxial with the spiral gear for reception of the threads of the screw shaft. The worm is driven by a flexible cable, which is secured in position by a plastic clip provided with spring fingers which snap into engagement with a housing shoulder.

INVENTOR
JOSEPH C. LITTMANN
BY Malcolm W. Fraser
ATTORNEY

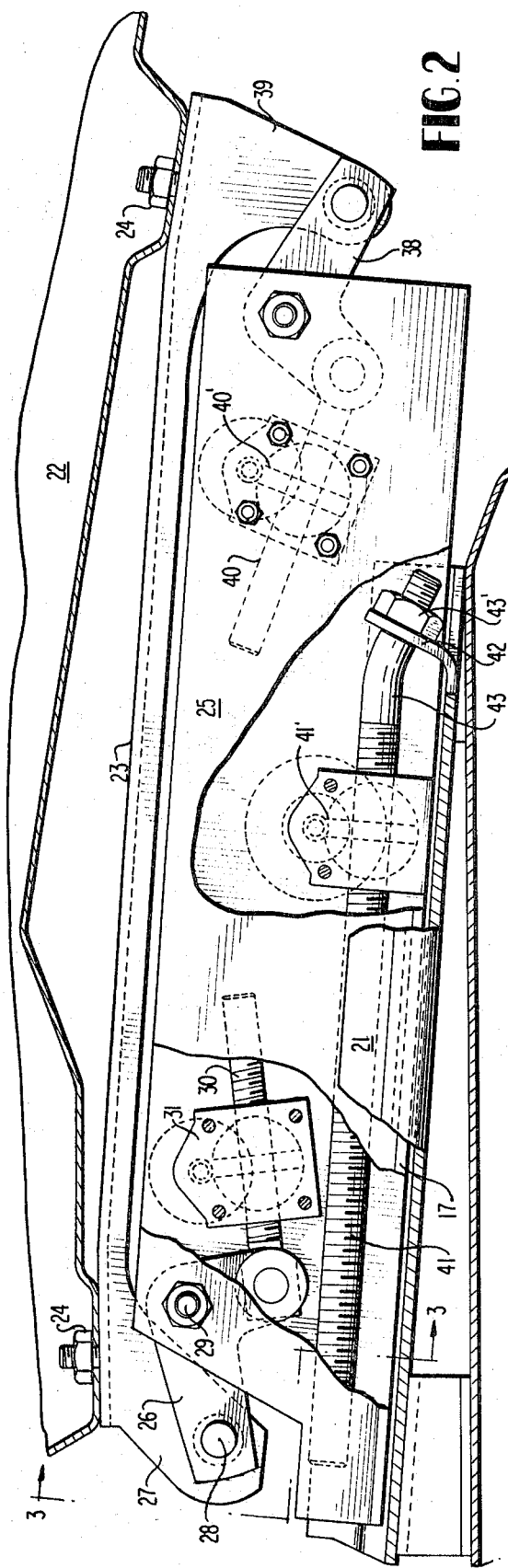
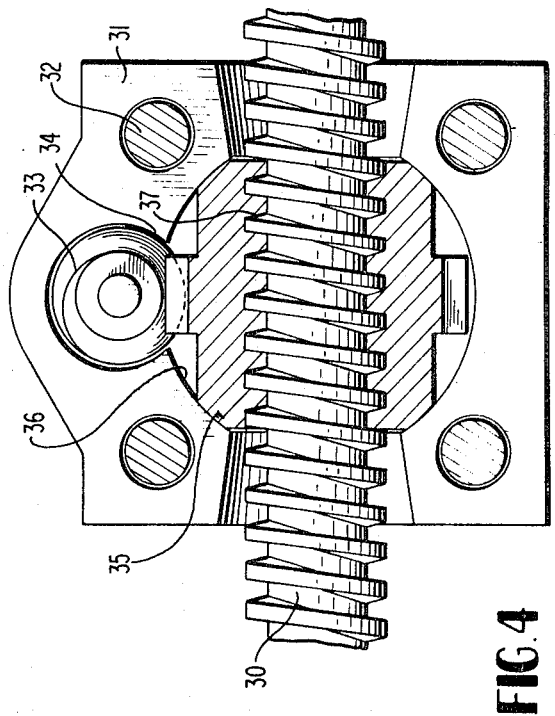
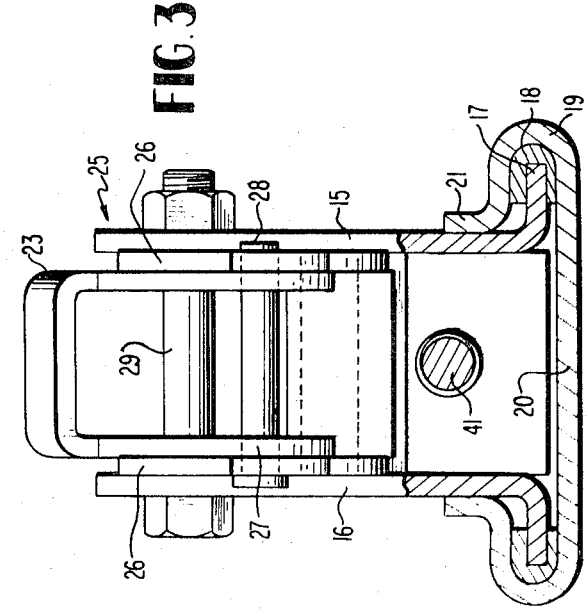
INVENTOR
JOSEPH C. LITTMANN
ATTORNEY

VEHICLE SEAT SUPPORTING AND ADJUSTING MECHANISM

An object of the present invention is to produce a new and improved drive for a vehicle seat-adjusting mechanism embodying a helical screw shaft driven by a rotatable nut or annulus mounted in a stationary housing so that it can rock sufficiently to accommodate relative movement between the screw shaft and adjacent parts.

A further object is to produce a new and improved arrangement of electrical driving motors for effecting a more efficient and economical operation of the actuating parts.

A still further object of the invention is to provide a vehicle seat-adjusting mechanism having rotary driven elements, electric motor means, one or more flexible drive shafts connecting the motor means to the rotary driven elements including clip means effective to afford accurate location and positive retention of the end of the flexible drive shaft in driving relation with the rotary driven elements.

A still further object is to provide a simple and reliable mounting for the screw shaft structure which provides a part of the horizontal seat-adjusting mechanism.

BRIEF DESCRIPTION OF THE DRAWINGS

FIG. 2 is an enlarged side elevation partly in section, and with some parts broken away, of one of the seat supporting and adjusting mechanism assemblies;

FIG. 3 is a sectional view substantially on the line 3–3 of FIG. 2;

FIG. 4 is an enlarged sectional view showing one of the drives from the cable-driven worm to the screw shaft through a rockable nut or annulus provided with a spiral gear engaged by the worm;

DESCRIPTION OF PREFERRED EMBODIMENT OF THE INVENTION

Figure 1:
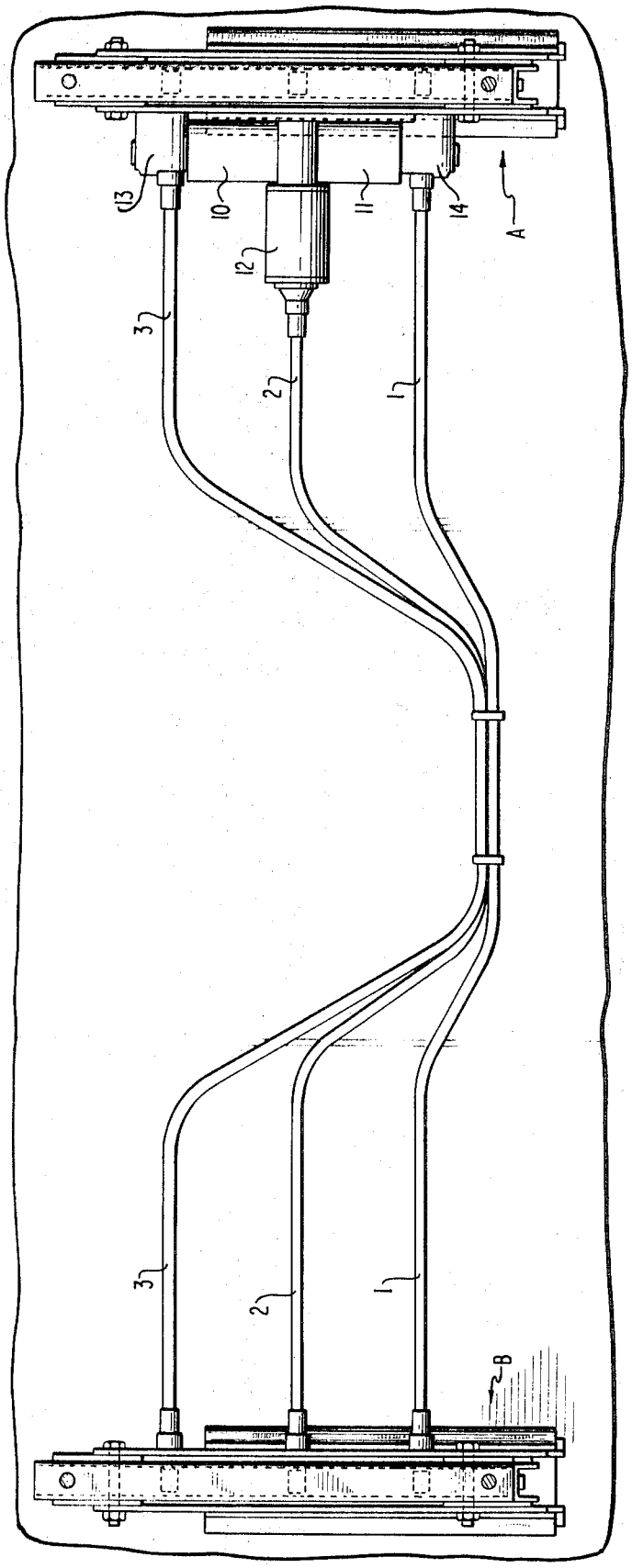
FIG. 1 is a top plan view of the vehicle seat supporting and adjusting mechanism.

The vehicle seat-adjusting mechanism comprises two sets of seat-adjusting assemblies A and B arranged adjacent opposite ends of the seat. The assembly A includes three reversible electric motors, motors 10 and 11 being arranged in end-to-end relation, and a motor 12 whose axis is at right angles to and is interposed between the motors 10 and 11. 13 and 14 designate gearboxes for the motors 10 and 11 respectively. From the motor 12 extends a driving cable 2 to the unit B and is operative to effect horizontal to-and-fro shifting movement thereof relative to a track portion on which it rests. Similarly, extending to the rear of the motor 12 is a relatively short operating cable for effecting simultaneous horizontal shifting movement for the assembly A. From the gearbox 13 extends a cable 3 to the unit B for effecting up or down movement of one side of the unit. A cable 1 extends from the gearbox 14 for the purpose of conjointly effecting up or down movement to the opposite side of the unit B. Similarly, from the gear boxes 13 and 14 extend relatively short cables for simultaneously effecting up or down movement to opposite sides of the unit A.

The assemblies A and B are quite similar, and in each instance the lower channel member 25 has vertical plates 15 and 16 which are spaced laterally from each other, and at the lower end of each plate is an outward lateral extension 17 adapted to slide in a shoe 18 which is of suitable plastic material. The shoe 18 is disposed in an arcuately bent portion 19 of the track portion 20. It will be observed that the portion 19 is bent upwardly as indicated at 21 to lie along the outer side of the adjacent side plates 15 and 16. A portion of the seat structure 22 is bolted to the upper channel member 23 by bolt and nut assemblies 24. The upper channel member 23 is connected at one end to the lower channel member 25 by a pair of crank arms 26. One end of each crank arm 26 is pivoted to a depending bracket portion 27 on a pin 28, and the intermediate portion is pivoted to the lower channel member 25 on a bolt 29. Pivoted to the opposite ends of the crank arms is one end of an helical screw shaft 30. The screw shaft 30 extends through flared holes in a rigid housing 31 (shown on FIG. 4), which is secured by bolt and nut assemblies 32 to the lower channel member 25. Rotatable in the housing 31 is a worm 33 which meshes with a spirally toothed gear 34, the worm 33 being fixed to and driven by the cable 1.

The spiral gear 34 is integral with the periphery of a nut or an annulus 35 which is generally of spherelike form and can rock within a spherical cavity 36 of the housing 31. Extending end-to-end through the annulus 35 coaxial with the gear 34 are screw threads 37 which mesh with the threads of the screw shaft 30. This enables the screw shaft 30 to rock to a limited extent about the threads of the worm 33 without disturbing the effectiveness of the drive. The teeth of the gear 34 can rock to the right or left of FIG. 4 and still remain in mesh with the teeth of the worm 33, so that within a limited range the annulus 35 can tilt in one direction or the other without effecting the driving connection. In this manner, one end of the upper channel 23 may be raised or lowered depending upon the direction of the rotation of the worm 33. The rocking movements of the screw shaft are accommodated by the member 35 which has free turning movement within the housing 31.

Similarly the right-hand end of the upper channel 23 (FIG. 2) can be raised or lowered by bellcranks 38, which are pivoted respectively to the lower channel 25 and to depending arms 39 on the upper channel 23. A screw shaft 40 pivoted to the bellcranks 38, is driven from the cable 3 by an assembly indicated at 40' which is similar to that shown in FIG. 4. The above description regarding the drive for the screw shaft 30 applies also with respect to the screw shaft 40.

The assembly comprising the upper channel 23 and lower channel 25 can be shifted to-and-fro horizontally along the track portion 20, and for this purpose an elongate helical screw shaft 41 has a downwardly inclined end portion 43 which projects through an opening in an upstanding lug 42 of the track portion so as to retain the shaft in fixed position. The shouldered end of the screw shaft 41 is threaded to receive a nut 43' for securing it in position. For effecting to-and-fro shifting movement, the worm on the end of the cable 3 meshes with a spherical gear indicated at 41' and being of the structure shown on FIG. 4, so that by the rotation of the spiral gear in one direction or the other, the desired to-and-fro movement of the assembly is effected. It will be understood that both assemblies A and B are conjointly driven to effect such horizontal seat adjustment.

Figure 6:
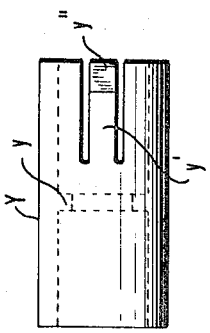
FIG. 6 is a side elevation of the cable clip.
Figure 5:
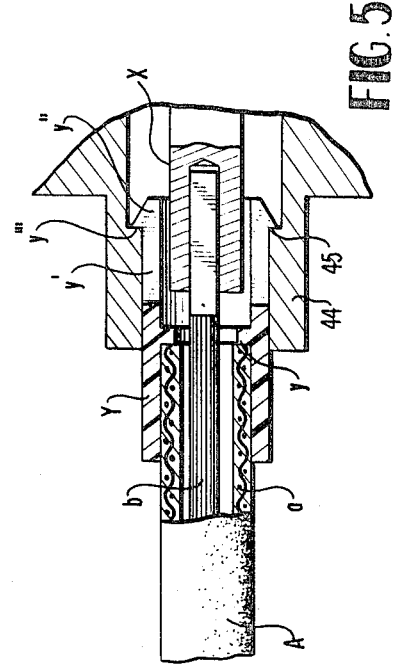
FIG. 5 is a fragmentary sectional view showing the clip connection between the driving cable and the worm.

FIGS. 5 and 6 illustrate the connection between the end of each of the cables 1, 2 or 3 with the respective driving worm 33. As there shown, the cable indicated at A has an outer protective sheath $a$ and an inner metallic rotating or driving shaft $b$. The outer end of the shaft $b$ may be polygonal in cross section to fit in a corresponding recess in an integral sleeve section X of the worm 33. The cable extends into a cylindrical clip Y which has an integral annular inwardly extending flange $y$ against which the end of the sheath $a$ abuts the flange $y$ being midway of the length of the clip. Formed in the outer end portion of the clip is a pair of diametrically opposed spring tongues $y'$, the outer ends of which are provided with outwardly extending inclined surfaces $y''$ providing inner shoulders $y'''$. The clip Y is of a plastic, such as acetal resin, which provides a flexible resilient structure. Thus, the clip is inserted through a throat 44 forming a part of the housing 31, causing the tongues $y'$ to be depressed or flexed inwardly, and after the clip has passed into the hole a sufficient distance, the tongues spring outwardly to engage a shoulder 45, thereby positively to secure it in position of use.

From the above description, it will be understood that assemblies A and B are arranged at opposite ends of the seat, such as the front seat of an automobile. Although controls for the electric motors 11, 12 and 13 are not shown, these ordinarily take the form of switches conveniently mounted on the seat and the door adjacent the driver. Electrical potential is supplied to the motors in the usual manner as well understood in the art. Thus, manipulation of the switches enables selective tilting of the front or rear of the seat as well as to-and-fro horizontal shifting movement of the seat.

The arrangement of the electric motors 11, 12 and 13 is desirable, since the power ends of the motors are in relatively close proximity to the seat actuator mechanisms. Only relatively short driving cables are needed to operate the parts of assembly A and the driving cables can extend in direct fashion to the assembly B.

The driving connection between the cable driven worm, such as 33, and the respective helical screw shaft is not only extremely simple and sturdy, but provides a drive which permits limited tilting of the screw shaft without interferring with efficient driving. The spiral gear 34 can automatically adjust to accommodate angular movement of the screw shaft or relative rocking movements between the driving and driven parts.

The mounting of the end portion of each cable by the use of the plastic clip Y not only facilitates the assembly of the cables but insures that the driving end is retained in proper position relative to the adjacent driven part, such as the worm 33. No special tools are required for application, and so soon as the cable has been applied to the clip, the assembly can be readily and quickly installed in position of use where it is secured from jars or vibrations.

What I claim is:

1. Vehicle seat supporting and adjusting mechanism comprising a vehicle seat, power seat adjusting mechanism comprising a pair of similar seat supporting and adjusting devices for supporting opposite ends of the vehicle seat, said devices comprising operating systems for effecting predetermined seat adjusting movements including helical screw shaft means individual to each system, electric motor means beneath the seat, said electric motor means comprising three separate motors carried by one of said seat supporting and adjusting devices, two motors being arranged in end-to-end relation and the third motor being disposed between the other two and at right angles thereto, output drives for said first two motors being at their outer ends remote from each other and the output drive for said third motor being fore and aft between the other motors, rotary output drive worm for each screw shaft means, flexible drive shaft connecting said motor means and each output drive worm, a member associated with each drive worm and having a screw-threaded bore operatively engaging the respective helical shaft means, a spiral gear on said member coaxial with said threaded bore and meshing with the respective worm, and a fixed housing for each member interiorly contoured to afford limited rocking movements of the member and spiral gear without disturbing the operative connection between said worm and said spiral gear whereby rotation of said member imparts relative movement between the respective device and said helical screw shaft for effecting predetermined seat adjusting movement.